(12) United States Patent
Ikuta

(10) Patent No.: US 6,579,050 B2
(45) Date of Patent: Jun. 17, 2003

(54) NUT ASSEMBLY FOR FASTENING AN ELEMENT TO A MEMBER HAVING AN INACCESSIBLE BACK PART

(75) Inventor: Kazuichi Ikuta, Osaka (JP)

(73) Assignee: Wakai & Co., Ltd., Osaka (JP)

( * ) Notice: Subject to any disclaimer, the term of this patent is extended or adjusted under 35 U.S.C. 154(b) by 0 days.

(21) Appl. No.: 10/011,276

(22) Filed: Dec. 11, 2001

(65) Prior Publication Data

US 2002/0071737 A1 Jun. 13, 2002

(30) Foreign Application Priority Data

Dec. 12, 2000 (JP) ........................................ 2000-404190

(51) Int. Cl.[7] .............................. F16B 21/00; F16B 27/00
(52) U.S. Cl. ........................ 411/344; 411/340; 411/345
(58) Field of Search ................................. 411/340, 344, 411/345, 346, 84, 85

(56) References Cited

U.S. PATENT DOCUMENTS 5,322,401 A * 6/1994 Vernet et al. ............... 411/344

6,226,952 B1 * 5/2001 Guardia .................. 411/85 X
6,386,809 B2 * 5/2002 Ikuta ...................... 411/344 X

FOREIGN PATENT DOCUMENTS

AU 400409 * 1/1970 .................. 411/344

* cited by examiner

*Primary Examiner*—Neill Wilson
(74) *Attorney, Agent, or Firm*—Wenderoth, Lind & Ponack, L.L.P.

(57) ABSTRACT

A nut assembly is proposed for fastening an instrument or the like to a member, the back of which is not accessible. A nut assembly comprises a pivotable nut having a threaded through-hole and a pin on each side thereof, and a frame having a flange portion formed with a bolt hole and an opposed pair of arms extending from both sides of the flange portion. The arms are each formed with an elongated hole, and the nut is formed at one end thereof with an inclined guide surface for pivoting the nut when pushed by a bolt. The nut is pivotably and slidably mounted between the arms with the pins received in the elongated holes formed in the arms. The arms have free end portions bent inwardly at an angle. With this arrangement, it is possible to prevent the nut from coming off the arms.

6 Claims, 3 Drawing Sheets

NUT ASSEMBLY FOR FASTENING AN ELEMENT TO A MEMBER HAVING AN INACCESSIBLE BACK PART

BACKGROUND OF THE INVENTION

This invention relates to a nut assembly used to bolt an instrument or the like to a member or a portion of which hands cannot reach the interior or the back.

FIG. 3 shows a conventional nut assembly used to fasten an instrument or the like to a member or a portion, the back of which is not accessible.

The nut assembly 1 comprises a nut 5 having a threaded through-hole 2 and pins 3 on both sides and formed at one end thereof with an inclined guide surface 4 for causing the nut to rotate when pushed by a bolt A, and a frame 9 having a pair of opposed arms 8 provided on both sides of a flange portion 7 having a bolt hole 6 at the center. By supporting the pins 3 in elongated holes 10 formed in the arms 8, the nut 5 is mounted between the opposed arms 8 so as to rotate about the pins 3 and to be slidable along the elongated holes 10.

For the nut assembly 1, lugs 11 are provided on both sides of the nut 5 near the outer peripheries of the arms 8 so that, with the nut 5 positioned at the tips of the elongated holes 10, the nut 5 can turn only 90° in one direction from the position in which the longitudinal direction of the nut 5 is aligned with the longitudinal direction of the arms 8 and can slide along the elongated holes 10 from the position in which the longitudinal direction of the nut 5 is perpendicular to the longitudinal direction of the arms 8. Further, at the tips of the arms 8, lugs 12 are provided, and the lugs 11 are adapted to engage the lugs 12 when the longitudinal direction of the nut 5 is aligned with the longitudinal direction of the arms 8.

The pins 3 provided on the sides of the nut 5 each have a shaft with a smaller diameter than the width of the elongated hole 10 and a head at one end of the shaft, the head having an oval shape with such a width as to allow the head to pass through the elongated hole 10 and a length larger than the width of the elongated hole 10. Thus, with the nut 5 located in its lower position and aligned with the arms 8 (as shown in FIG. 3), the pins 3 can be inserted into the elongated holes 10 in the arms 8. But, with the nut 5 perpendicular to the arms 8, the pins 3 will not come out of the elongated holes 10.

The flange portion 7 of the frame 9 is rectangularly shaped. Around the bolt hole 6 in the flange portion 7, a bolt-guiding wall 13 for axially guiding a bolt A inserted through the bolt hole 6 so as for the bolt to be reliably threaded into the threaded hole 2 is provided so as to protrude toward the bolt hole 6.

FIGS. 4 and 5 show the conventional nut assembly 1 inserted into a hole 15 formed in the member B to mount an instrument (not shown) to the member using a bolt. FIG. 6 shows how an instrument C is fastened to the member B by means of a bolt A tightened into the nut assembly 1. As shown in FIGS. 4 and 5, the nut assembly 1 is inserted into the hole 15 with the nut 5 first and further pushed in until the flange portion 7 abuts the surface of the member B: With an instrument C superposed on the flange portion 7 of the nut assembly 1 (as shown in FIG. 6), the bolt A is inserted into a hole D of the instrument C while pushing the inclined guide surface 4 with the tip of the bolt, thereby turning the nut 5 by 90°. The tip of the bolt is guided into a tapered guide surface 14 of the nut 5 so as to threadedly engage female threads of the threaded hole 2. When the bolt is turned further, the nut 5 is pulled close. The mounting is now complete.

However, with the conventional nut assembly 1, the diameter and shape of the hole 15 formed in the member B is not always adapted to the nut. In particular, if it is slightly deformed or is slightly smaller, when inserted into the hole 15, as shown in FIGS. 4 and 5, the portions of the arms 8 near the flange 7 will be pushed inwardly as shown in FIG. 3 at P1. If such force is applied, the tips of the arms 8 tend to spread with the corner portions 16 of the nut 5 as fulcrums.

With the nut 5 aligned with the arms 8 in a lengthwise direction, if the nut 5 is raised by the arm spreading force off the lower ends of the elongated holes 10, the arms 8 can be freed from the restraint by the heads of the pins 3. This will lead to an unfavorable situation in which the arms 8 disengage from the pins 3, so that the nut 5 comes off the arms 8.

A solution in which the large-diameter portions at the tips of the pins 3 are made more rigid to prevent the nut 5 from coming off has been proposed. But this may hinder smooth turning of the nut.

Also, when handling the nut assembly 1 by hand, one may be caught by the tips of the arms 8. This will spread the tips, causing the nut 5 to come off.

SUMMARY OF THE INVENTION

According to this invention, there is provided a nut assembly comprising a pivotable nut having a threaded through-hole and a pin on each side thereof, and a frame having a flange portion formed with a bolt hole and an opposed pair of arms extending from both sides of the flange portion, the arms each being formed with an elongated hole, the nut being formed at one end thereof with an inclined guide surface for pivoting the nut when pushed by a bolt, the nut being pivotably and slidably mounted between the arms with the pins received in the elongated holes formed in the arms, characterized in that the arms having free end portions bent inwardly at an angle toward each other.

According to this invention, the arms each include a first portion having an angle of 90° or over with respect to the flange portion and a second portion continuing from the first portion and inwardly bent from the first portion. In the illustrated embodiment, the arms have alsmost their entire lengths bent inwardly at an angle toward each other.

In this invention, since the nut is sandwiched between the arms, it is necessary that the arms have resilience. Normally, a metallic thin plate or a synthetic resin is used. If larger resilience is required, the metallic thin plate may be subjected to hardening such as heat treatment.

Other features and objects of the present invention will become apparent from the following description made with reference to the accompanying drawings, in which:

DETAILED DESCRIPTION OF THE PREFERRED EMBODIMENT

Hereinbelow, the embodiment of this invention will be described with reference to FIGS. 1 and 2. Since the basic structure of the nut assembly is the same as described in the prior art section with reference to FIGS. 3 to 6, the same numerals are used for the same portions and only the important points will be described.

Figure 1:
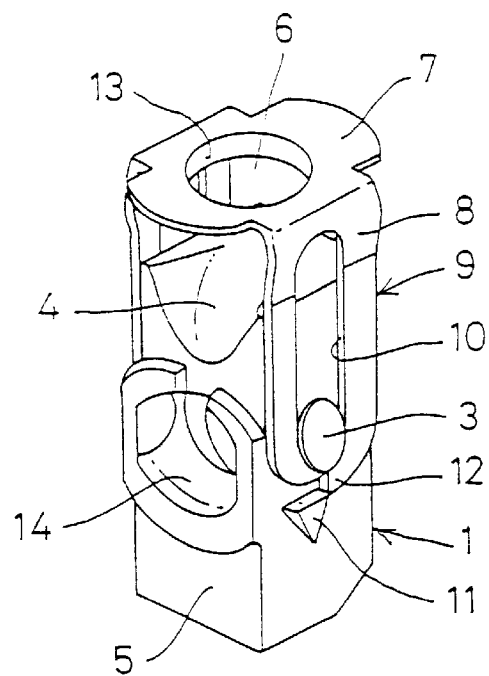
FIG. 1 is a perspective view showing a nut assembly according to the present invention.
Figure 2:
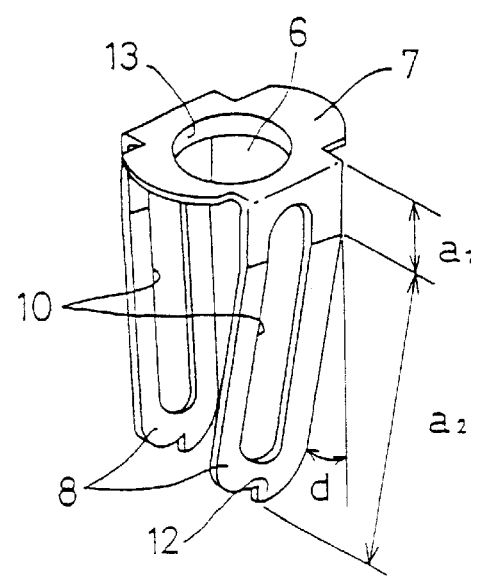
FIG. 2 is a perspective view showing a frame of the nut assembly of this invention.

As shown in FIGS. 1 and 2, the frame 9 of the nut assembly 1 of this invention is structured such that free end portions a2 of the arms 8 away from the flange portion 7 are bent inwardly at an angle d.

The nut 5 is sandwiched between the two arms 8 while pushing the arms 8 apart, and supported by the pins 3 which are received in the elongated holes 10 of the arms.

The the nut assembly 1 of this invention is inserted into the hole 15 of the member B with the nut 5 first and further pushed in until the flange portion 7 abuts the surface of the member B. With an instrument superposed on the flange portion 7 of the nut assembly 1 which has been inserted, a bolt A is inserted to push the inclined guide surface 4 with the tip of the bolt, thereby turning the nut 5 by 90°. The tip of the bolt A is guided into the tapered guide surface 14 of the nut 5 so as to threadedly engage female threads of the threaded hole 2. When the bolt A is turned further, the nut 5 is pulled close. The mounting is now complete.

Figure 3:
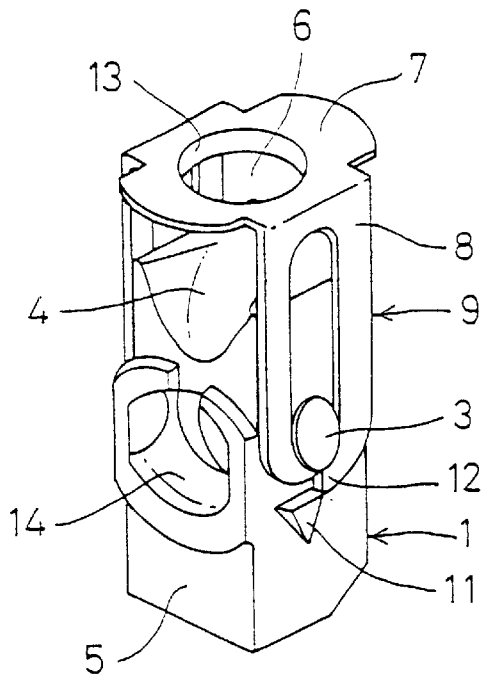
FIG. 3 is a perspective view of a conventional nut assembly.
Figure 4:
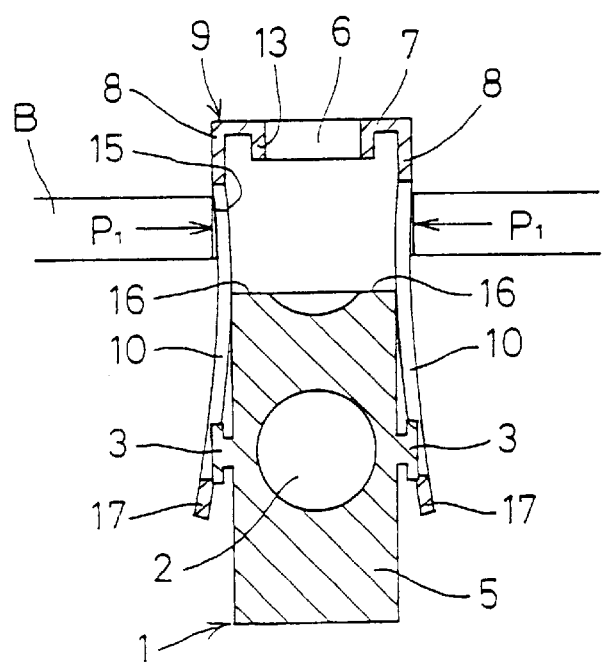
FIG. 4 is a perspective view showing a state in which free end portions of arms of the conventional nut assembly have spread.
Figure 5:
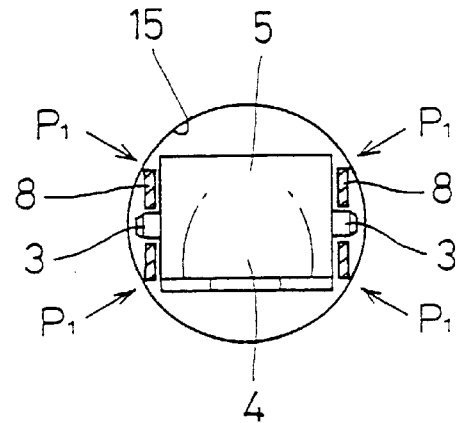
FIG. 5 is a horizontal sectional view around a hole of an instrument.
Figure 6:
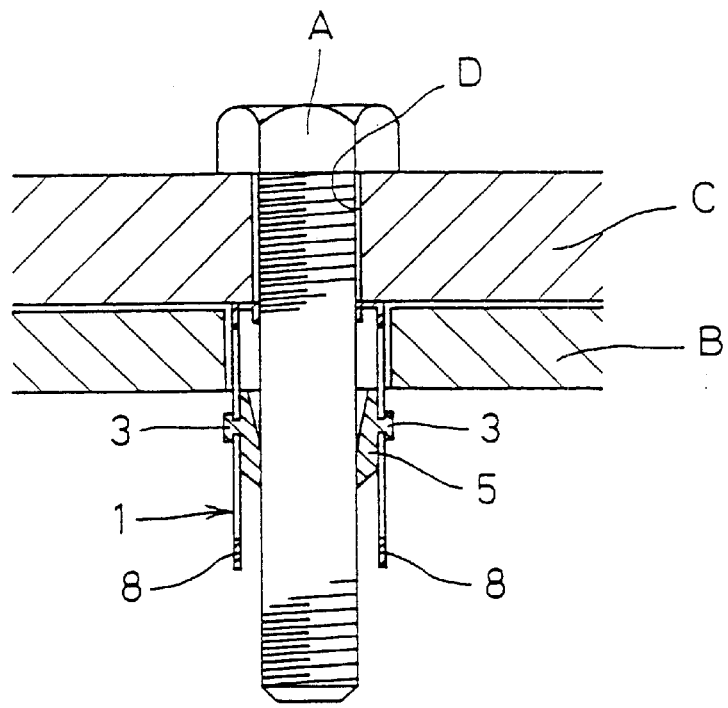
FIG. 6 is a sectional view showing how an instrument is tightened by the conventional nut assembly.

During inserting, if the diameter or shape of the hole 15 formed in the member B is not adapted to the nut assembly, particularly if it is slightly small, when it is inserted into the hole 15, as shown in FIGS. 4 and 5, portions of the arms 8 near the flange 7 will be pushed inwardly. If such force is applied, the free end portions of the arms 8 tend to spread with the corner portions 16 of the nut 5 as fulcrums. But with the nut assembly of this invention, since the free end portions a2 of the arms 8 are bent inwardly at an angle d beforehand, a force urging them inwardly exists always. Thus, even if the portions a1 of the arms 8 near the flange portion 7 are pushed inwardly and as shown in FIG. 3, such a spreading force as to ride over the pins 3 is produced, it will be offset. Thus, it is possible to prevent the pins 3 from coming out of the elongated holes 10.

The arms 8 are preferably provided at a portion near the flange 7 with a wall portion a1 that is longer than the thickness of the member B and substantially vertical or spread outwardly, and a free end portion a2 bent inwardly at an angle d from the terminal end of the portion a1. With this arrangement, it is possible to maintain the contact stability between the nut assembly 1 and the member B during inserting even if the hole formed in the member B is slightly large.

Since the free end portions of the arms 8 are bent inwardly toward both sides of the nut 5, the chance of the tips 17 of the arms getting caught by e.g. fingers can be reduced.

The inwardly bent free end portions a2 are shown as straight. But they may be bent arcuately or stepwise.

As described above, according to this invention, since the frame 9 of the nut assembly 1 is structured such that the free end portions 2a of its arms 8 spaced from the flange portion 7, are bent inwardly at an angle d, even if the diameter or shape of the hole 15 formed in the member B is not adapted to the nut assembly 1, particularly if it is slightly smaller, the nut 5 will not come off the arms 8.

What is claimed is:

1. A nut assembly comprising a pivotable nut having a threaded through-hole and a pin on each side thereof, and a frame having a flange portion formed with a bolt hole and an opposed pair of arms extending from both sides of said flange portion, said arms each being formed with an elongated hole, said nut being formed at one end thereof with an inclined guide surface for pivoting said nut when pushed by a bolt, said nut being pivotably and slidably mounted between said arms with said pins received in said elongated holes formed in said arms, wherein said arms of said frame have free end portions bent inwardly at an angle.

2. The nut assembly as claimed in claim 1, wherein each of said free end portions constitutes almost an entire length of a respective one of said arms.

3. The nut assembly as claimed in claim 1, wherein each of said free end portions constitutes a majority of a length of a respective one of said arms.

4. The nut assembly as claimed in claim 1 wherein said arms each include a first portion having an angle of 90° or over with respect to said flange portion and a second portion continuing from said first portion and inwardly bent from said first portion.

5. The nut assembly as claimed in claim 1, wherein each of said free end portions constitutes almost an entire length of a respective one of said arms.

6. The nut assembly as claimed in claim 4, wherein each of said free end portions constitutes a majority of a length of a respective one of said arms.

* * * * *